United States Patent [19]
Senda

[11] Patent Number: 5,532,745
[45] Date of Patent: Jul. 2, 1996

[54] MOTION PICTURE ADAPTIVE PREDICTION ENCODER WITH A QUANTIZATION PARAMETER DECIDED IN ACCORDANCE WITH BLOCK CLASSIFICATION

[75] Inventor: Yuzo Senda, Tokyo, Japan

[73] Assignee: NEC Corporation, Tokyo, Japan

[21] Appl. No.: 120,079

[22] Filed: Sep. 13, 1993

[30] Foreign Application Priority Data

Sep. 11, 1992 [JP] Japan .................................. 4-242448

[51] Int. Cl.$^6$ ............................................ H04N 7/36
[52] U.S. Cl. .......................................... 348/405; 348/420
[58] Field of Search ................................. 348/419, 420, 348/405, 416, 415, 409, 390, 384.

[56] References Cited

U.S. PATENT DOCUMENTS

| | | | |
|---|---|---|---|
| 4,734,767 | 3/1988 | Kaneko et al. | 358/133 |
| 5,016,010 | 5/1991 | Sugiyama | 341/67 |
| 5,144,426 | 9/1992 | Tanaka et al. | 358/133 |
| 5,323,187 | 6/1994 | Park | 348/405 |
| 5,337,087 | 8/1994 | Mishima | 348/405 |

*Primary Examiner*—Tommy P. Chin
*Assistant Examiner*—Bryan S. Tung
*Attorney, Agent, or Firm*—Foley & Lardner

[57] ABSTRACT

Blocks of each of successive frames of a motion picture signal are classified into classified blocks in accordance either with selected schemes for use in adaptive prediction encoding the signal or with whether the selected schemes are restricted or not. On encoding each classified block, a quantization parameter is decided based on an amount of codes produced per classified block. The codes are stored in a buffer, and delivered outwardly of the buffer at a predetermined code rate while the remaining codes are reserved in the buffer. The quantization parameter is also based on an initial amount of the reserved codes kept in the buffer at a beginning of each frame, a code amount characteristic value, and an amount of codes assigned to each classified block. The code amount characteristic value is calculated by a product of the quantization parameter and the amount of codes produced. The amount of codes assigned to each classified block is based on the amount of codes produced, an individual amount of the reserved codes kept for each classified block, and the code amount characteristic value. This makes it possible to maintain the quantization parameter substantially constant throughout the successive frames and to reduce delays caused by the buffer.

3 Claims, 10 Drawing Sheets

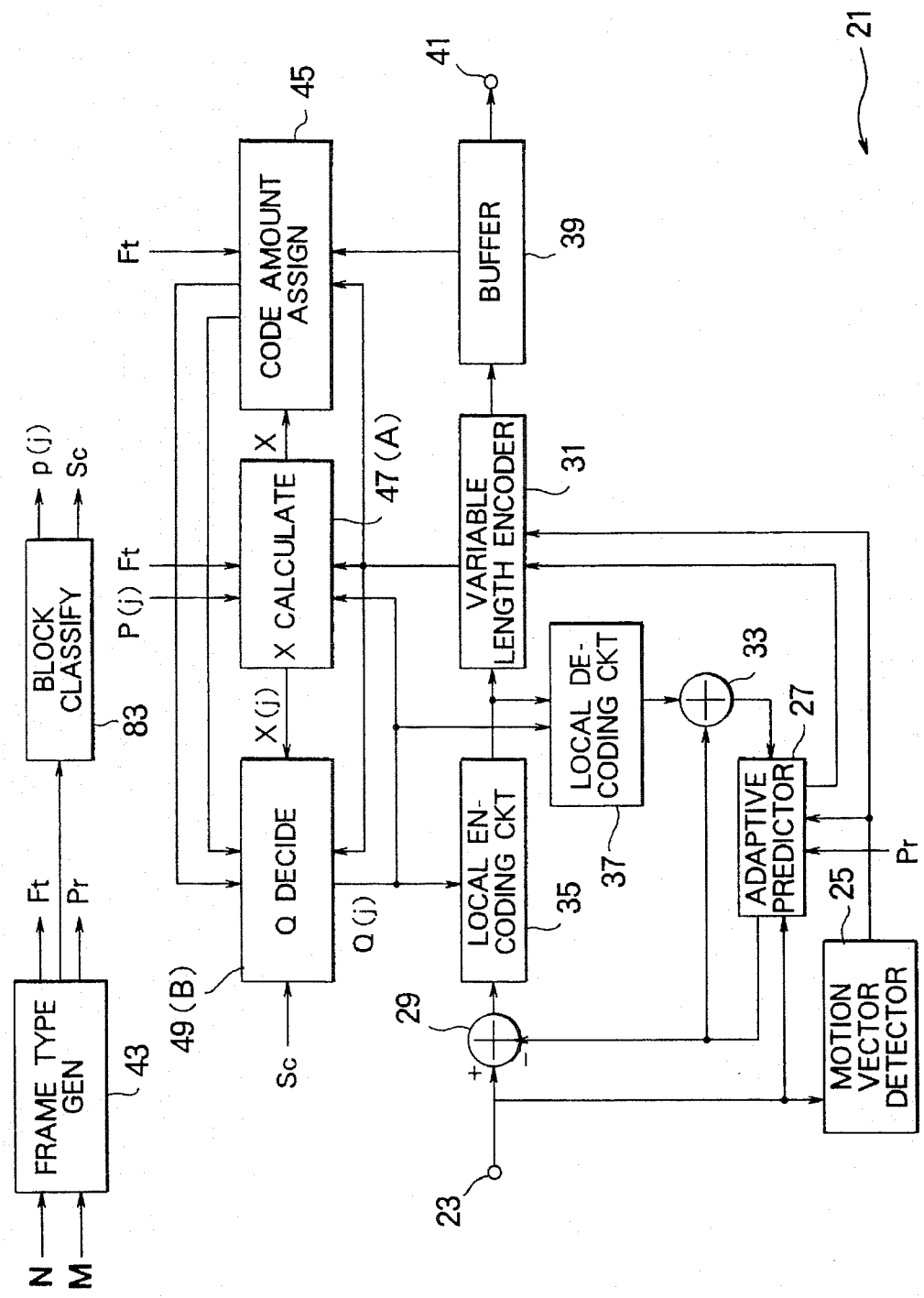
F I G. 12

MOTION PICTURE ADAPTIVE PREDICTION ENCODER WITH A QUANTIZATION PARAMETER DECIDED IN ACCORDANCE WITH BLOCK CLASSIFICATION

BACKGROUND OF THE INVENTION

This invention relates to a motion picture encoding device to which an adaptive prediction encoding scheme is applied.

A motion picture signal represents successive motion pictures with an enormous amount of information and is encoded into an encoded picture signal with the enormous amount of information compressed to a great extent by utilizing high time and space correlations which the motion picture signal has. In accordance with an interframe prediction encoding scheme, the time correlation is used to produce a prediction error signal by predicting the motion picture of a current frame from the motion picture which is represented by an immediately preceding frame and is already subjected to the interframe encoding. Motion compensation interframe prediction encoding is an improvement in the interframe prediction encoding. In interfield prediction encoding, two successive fields of the motion picture signal are used in place of the current and the preceding frames used in the interframe encoding. In intraframe or intrafield encoding, each frame or field is processed with no prediction used along a time axis. In accordance with the adaptive prediction encoding, the above-exemplified encoding schemes are adaptively switched from one to another.

It is possible with the adaptive prediction encoding to attain a high encoding efficiency. When either the intraframe or the intrafield encoding is included in the encoding schemes switched to carry out the adaptive prediction encoding, the adaptive prediction encoding is very useful because it is possible to apply to this scheme a refresh technique which will presently be described.

Besides the refresh technique, other techniques are also useful in the adaptive prediction encoding. A code transform technique is for subjecting a plurality of signals to linear transform for encoding these signals. When used in the adaptive prediction encoding, the code transform technique is applied to the prediction error signal in compressing its space (horizontal and vertical) redundancies to a remarkable extent. A variable length encoding technique is for compressing an amount of information in a well-known manner for transmission or storage. A code amount control technique is for controlling an amount of actually produced codes and a quantization step with reference to an amount of output codes in the manner which will shortly be described.

The refresh technique is for dealing with transmission error recovery and/or with start of decoding at an indefinite time instant and is used in general as a frame refresh technique of applying the intraframe encoding to an entire frame. It may be mentioned here in this connection that each frame of a video signal is divisible into a predetermined number of blocks. The intraframe prediction is restricted in some of the blocks in each frame. It consequently follows that the amount of actually produced codes becomes considerably large in a frame subjected to refresh when compared with the amount of codes actually produced in each of other frames. Such a difference in the amount of actually produced codes is dealt with by a transmission buffer before transmission or storage of the output codes at a predetermined code rate. Use of the buffer, however, means a delay in transmitting or storing the actually produced codes. This is contradictory to transmission or storage with a short delay. In other words, the buffer must have a small buffer capacity in order to achieve the short delay. In consideration of such circumstances, a slice refresh technique has been introduced for application of the refresh technique to a slice which is composed of a preselected number of blocks in each frame and only in which the interframe coding is restricted. Codes are, however, actually produced to a very great extent in a refreshed slice.

The code amount control technique is for controlling the amount of actually produces codes in consideration of the amount of output codes of the buffer. Inasmuch as the buffer holds an amount of reserved codes given by subtracting the amount of output codes from the amount of actually produced codes, it is possible to direct attention to a buffer occupancy amount representative of the amount of reserved codes. On the other hand, the amount of actually produced codes depends on the quantization step which is used in quantizing various coefficients derived by the code transform technique. Consequently, the code amount control technique is based primarily on decision of a quantization parameter Q in consideration of the buffer occupancy amount. The quantization parameter is a variable which directly decides the quantization step. By using a control parameter $\alpha$ for deciding a speed by which control of the amount of actually produced codes is followed, the quantization parameter is calculated by multiplying the buffer occupancy amount by the control parameter. Such a code amount control technique is conventional and is described, for example, in ISO/IEC/JTC1/SC29/WG11/MPEG92/160. It is believed that this reference merely describes the conventional code amount control technique and is not material to the examination of this patent application although this reference is as thick as 128 pages.

In the manner which will later be described in greater detail, known is a motion picture encoding device which is for encoding a motion picture signal composed of successive frames, each composed of a predetermined number of blocks, and in which a selected scheme is selected from a plurality of various encoding schemes adaptively in correspondence to the blocks of the successive frames. The blocks under consideration will herein be called unclassified blocks.

In accordance with prior art, the motion picture encoding device comprises a calculating unit for calculating a code amount characteristic value representative of a product of a quantization parameter and an amount of codes which are actually produced from each of the unclassified block in an actually produced code amount. An assigning unit assigns an assigned code amount to each of the unclassified blocks based on the code amount characteristic value. A deciding unit decides the quantization parameter based on the assigned code amount and the actually produced code amount. An encoding unit encodes the unclassified blocks of the successive frames based on the quantization parameter.

In such a conventional motion picture encoding device, attention has been directed in the calculating and the assigning units to a fluctuation in the amounts of codes actually produced in one and another of the successive frames. Attention has, however, not been directed to a like fluctuation in the amounts of codes actually produced in one and another of the unclassified blocks in each frame. These fluctuations are not taken into account for the deciding unit to decide the quantization parameter.

In the manner described heretobefore, a transmission buffer is used in practice in the encoding unit to cope with a difference between the amount of actually produced codes and an amount of output codes which represent an output picture and are produced by the encoding unit either for transmission to a transmission medium or storage in a recording medium An occupancy amount of reserved codes remains in the buffer and grows greater with an increase in the amount of the actually produced codes. The quantization parameter depends on the buffer occupancy amount. When the amount of actually produced codes is great in some of the unclassified blocks that may be called particular blocks, the quantization parameter grows accordingly greater. This undesiredly gives rise to an increase in the quantization step at the particular blocks to deteriorate the output picture.

When the buffer is possessed of a small buffer capacity in order to process the motion picture signal with a short delay, the control parameter is given an accordingly great value. This results in a consequently great amount of variation in the quantization parameter. The output picture is more deteriorated to be unpleasant to look at. When the slice refresh technique is resorted to, the amount of actually produced codes varies much. The output picture becomes objectionable before and after use of the slice refresh technique.

SUMMARY OF THE INVENTION

It is consequently an object of the present invention to provide a motion picture encoding device to which an adaptive prediction encoding scheme is applied and which can encode an input picture into an output picture of a high quality.

It is another object of this invention to provide a motion picture encoding device which is of the type described and which can keep the quality of the output picture substantially uniform within earth frame of a motion picture signal representative of successive motion pictures, each as for the input picture.

It is still another object of this invention to provide a motion picture encoding device which is of the type described and which can keep the quality of the output picture in the manner described above even when a transmission buffer of a small buffer capacity is used for producing buffer output codes representative of the output picture.

It is yet another object of this invention to provide a motion picture encoding device which is of the type described and which can keep the quality of the output picture as described even when a slice refresh technique is resorted to for encoding the input picture into the output picture.

Other objects of this invention will become clear as the description proceeds.

In accordance with this invention, there is provided a motion picture encoding device which is for encoding a motion picture signal composed of successive frames, each composed of a predetermined number of unclassified blocks, in which selected schemes are selected from a plurality of encoding schemes in correspondence to the unclassified blocks of the successive frames, and which comprises: (a) classifying means for classifying the unclassified blocks of each of the successive frames into classified blocks; (b) calculating means for calculating a code amount characteristic value by a product of a multiplication factor and an amount of codes actually produced from each of the classified blocks as an actually produced code amount; (c) assigning means for assigning assigned code amounts to the classified blocks based on the code amount characteristic values calculated in connection with the classified blocks; (d) deciding means for deciding a quantization parameter for use as the multiplication factor based on the actually produced code amount and one of the assigned code amounts that is assigned by using the actually produced code amount; and (e) encoding means for encoding the classified blocks of the successive frames in accordance with the selected schemes and the quantization parameter.

In accordance with this invention, there is additionally provided a motion picture encoding device which is for encoding a motion picture signal composed of successive frames, each composed of a predetermined number of unclassified blocks, and which comprises: (A) classifying means for classifying the unclassified blocks of each of the successive frames into classified blocks; (B) encoding means comprising (B1) means for encoding the classified blocks into produced codes in accordance with a quantization parameter and selected schemes adaptively selected from a plurality of encoding schemes in correspondence to the classified blocks and (B2) a buffer in which the produced codes are accumulated as accumulated codes while producing the accumulated codes as output codes per classified block at a predetermined code rate to keep reserved codes at a time; and (C) deciding means for deciding the quantization parameter for each of the classified blocks based on an amount of the produced codes in each classified block, amounts of codes assigned to the classified blocks as assigned code amounts, and an initial amount of the reserved codes kept at a beginning of each frame.

For the motion picture encoding device additionally provided as above, the deciding means comprises: (C1) calculating means for calculating a code amount characteristic value per classified block by a product of the quantization parameter and the amount of produced codes; (C2) assigning means for assigning the assigned code amounts to the classified blocks based on the amount of produced codes, individual amounts of the reserved codes kept during the classified blocks, and the code amount characteristic value; and (C3) quantization parameter deciding means for deciding the quantization parameter based on the amount of produced codes, the initial amount, and the code amount characteristic value.

According to an aspect of this invention, the classifying means of the above-described motion picture encoding device classifies the unclassified blocks into the classified blocks in accordance with the selected scheme.

According to another aspect of this invention, the classifying means of the above-described motion picture encoding device classifies the unclassified blocks into the classified blocks in accordance with whether or not the selected schemes are restricted.

BRIEF DESCRIPTION OF THE DRAWING

FIG. 12 is a block diagram of a motion picture encoding device according to a second embodiment of this invention;

DESCRIPTION OF THE PREFERRED EMBODIMENT

Figure 1:
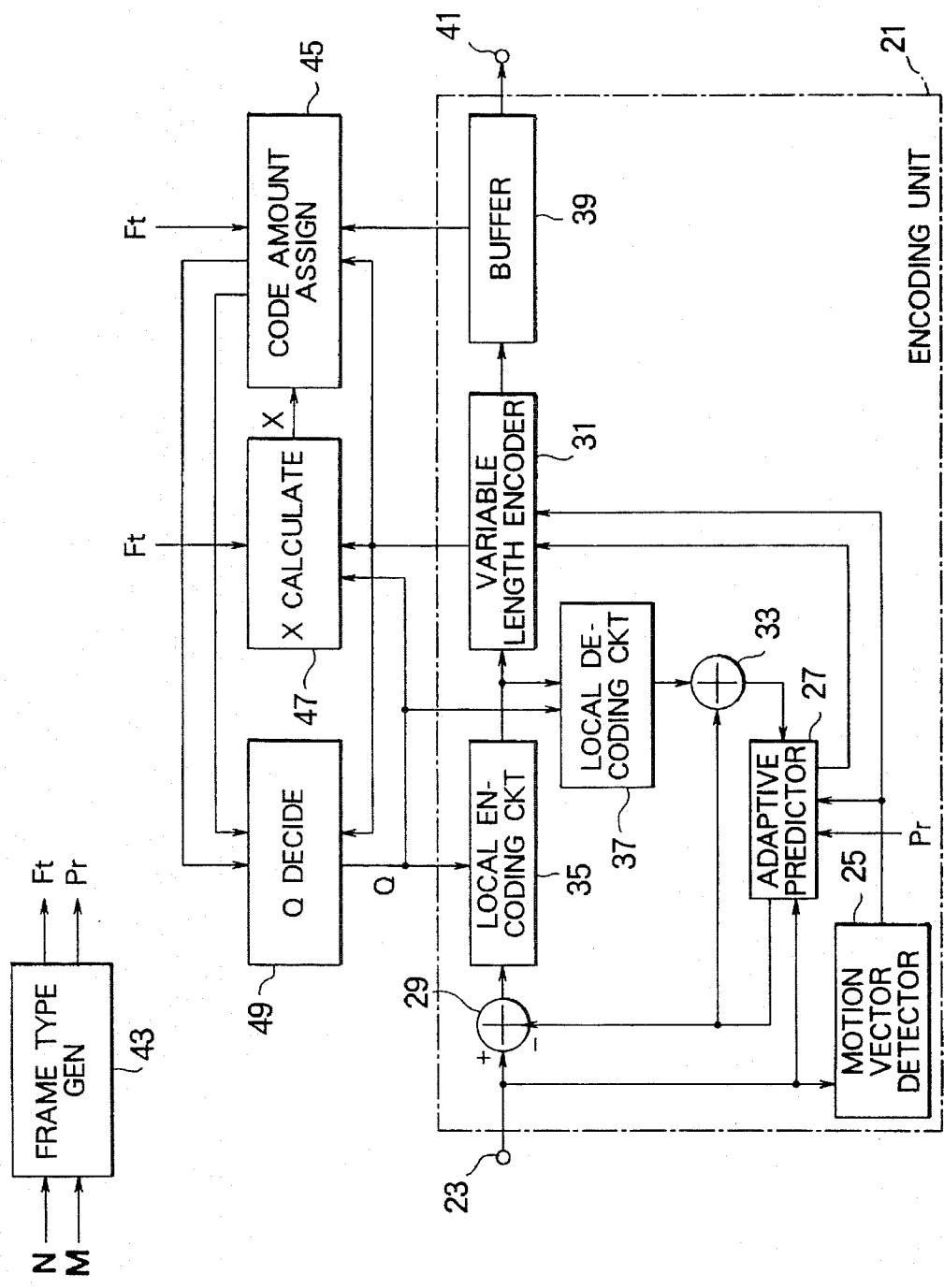
FIG. 1 is a block diagram of a conventional motion picture encoding device.

Referring to FIG. 1, a conventional motion picture encoding device will first be described in order to facilitate an understanding of the present invention. Broadly speaking, the motion picture encoding device comprises an adaptive prediction encoding unit 21 and various control units for controlling the adaptive prediction encoding unit 21 in the manner described in the following.

From a device input terminal 23, the adaptive prediction encoding unit 21 is supplied with a motion picture signal representative of successive motion pictures. In the manner known in the art, the motion picture signal is composed of successive frames, each representing one of the motion pictures and composed of a predetermined number of blocks representative of picture parts of the above-mentioned one of the motion pictures. From the device input terminal 23, the motion picture signal is delivered to a motion vector detector 25, an adaptive predictor 27, and a subtracter 29.

The motion vector detector 25 is for detecting a motion vector between the picture parts represented by corresponding blocks in two consecutive frames. The "corresponding blocks" are known in the art and will not herein be discussed in detail. The motion vector detector 25 produces a motion vector signal representative of such motion vectors. From the motion vector detector 25, the motion vector signal is delivered to the adaptive predictor 27 and to a variable length encoder 31.

In the manner which is known in the art and will presently be described a little more in detail, an adder 33 produces a local decoded signal representative of a locally decoded picture. Supplied from the device input terminal 23 with the motion picture signal of a current frame of the two consecutive frames and furthermore with a prediction restriction signal Pr which will later be described, the adaptive predictor 27 selects a most pertinent type of an adaptive prediction encoding scheme for each block of the current frame as a selected scheme. The adaptive predictor 27 thereby produces an adaptive prediction type signal representative of the selected scheme for delivery to the variable length encoder 31. At the same time, the adaptive predictor 27 produces a predicted picture signal representative of a predicted picture on a block-by-block basis for supply to the subtracter 29 and to the adder 33.

Supplied from the device input terminal 23 with the motion picture signal of the current frame and from the adaptive predictor 27 with the predicted picture signal, the subtracter 29 produces a difference signal representative of a picture difference between the motion picture of the current frame and the predicted picture. The different signal represents a predicted difference between these two pictures.

A combination of a converter and a quantizer serves as a local encoding circuit 35 and is supplied from the subtracter 29 with the difference signal and furthermore with a quantization parameter signal Q representative of a quantization parameter Q (same reference symbol being used) which will later be described. In the local encoding circuit 35, the converter subjects the difference signal to code transform to produce coefficients of a linear transform of the difference signal. Using a quantization step decided by the quantization parameter, the quantizer quantizes the coefficients into quantized codes and produces a quantized signal representative of the quantized codes for delivery to the variable length encoder 31.

A combination of a dequantizer and an inverse converter serves as a local decoding circuit 37 and is supplied from the local encoding circuit 35 with the quantized signal and furthermore with the above-mentioned quantization parameter signal. In the local decoding circuit 37, the dequantizer dequantizes the quantized codes into reproductions of the above-mentioned coefficients by using the quantization step described above. The inverse converter subjects the reproductions of the coefficients to inverse transform which corresponds to the code transform. The inverse converter thereby produces a circuit output signal representative of a prediction decoded difference picture.

It is now understood that the adder 33 is supplied from the local decoding circuit 37 with the circuit output signal and from the adaptive predictor 27 with the predicted picture signal. The adder 33 produces in this manner the local decoded signal,representative of the locally decoded picture which is given by a sum of the predicted picture and the prediction decoded difference picture.

Supplied from the motion vector detector 25 with the motion vector signal, from the adaptive predictor 27 with the prediction type signal, and from the local encoding circuit 35 with the quantized signal, the variable length encoder 31 subjects to variable length encoding the motion vectors to produce a variable length encoded signal which represents variable length codes as actually produced codes in each block. At the same time, the variable length encoder 31 counts the number or an amount of the actually produced codes per block to produce a produced code amount signal representative of the amount of actually produced codes which varies from block to block.

A transmission buffer 39 is supplied from the variable length encoder 31 with the variable encoded signal and accumulates the variable length codes produced in the blocks of the successive frames. The buffer 39 is thereby loaded with accumulated codes and delivers the accumulated codes as buffer output codes to a device output terminal 41 and thence either to a transmission medium or to a recording medium (both not shown) at a predetermined code rate. The buffer 39 thereby holds at a time a variable amount of reserved codes remaining in the buffer 39 which is supplied with the actually produced codes while producing the buffer output codes. At the same time, the buffer 39 produces a buffer occupancy signal representative of an amount of the reserved codes. In addition, the buffer 39 produces a frame head occupancy amount signal representative of a frame head or initial occupancy amount which is an amount of the variable length codes stored in the buffer 39 at a head or leading edge of each frame. The buffer output codes represent an output picture in each frame.

Supplied with first and second parameters M and N, a frame type generator 43 decides a frame type to produce a frame type signal Ft representative of the frame type. In addition, the frame type generator 43 produces the prediction repetition signal Pr for delivery to the adaptive prediction 27. The prediction restriction signal indicates the selected scheme which should be restricted from application to some of the blocks that may be called particular blocks.

A code amount assigning unit 45 is supplied from the frame type generator 43 with the frame type signal Ft, from the variable length encoder 31 with the produced code amount signal, from the buffer 39 with the buffer occupancy amount signal, and furthermore with a code amount characteristic signal X which will presently be described and represents a code amount characteristic value X per frame. Using the frame type, the actually produced code amount per block, the buffer occupancy, and the code amount characteristic value, the code amount assigning unit 45 assigns an assigned code amount per block and produces a code amount signal representative of the assigned code amount. The frame head occupancy signal is produced through the code amount assigning unit 45.

A conventional code amount characteristic value calculating unit 47 is supplied from the frame type generator 43 with the frame type signal Ft, from the variable length encoder 31 with the produced code amount signal per block, and with the above-mentioned quantization parameter signal Q. In the manner which will shortly be described, the code amount characteristic value calculating unit 47 calculates the code amount characteristic value X per block and produces the above-described code amount characteristic value signal X for delivery to the code amount assigning unit 45.

A conventional quantization parameter deciding unit 49 is supplied from the code amount assigning unit 45 with the code amount signal and with the frame head occupancy signal and from the variable length encoder 31 with the produced amount signal per block. In the manner which will soon be described, the quantization parameter deciding unit 49 decides the quantization parameter Q and produces the quantization parameter signal Q for delivery to the local encoding and decoding circuits 35 and 37 and to the code amount characteristic value calculating unit 47.

Figure 2:
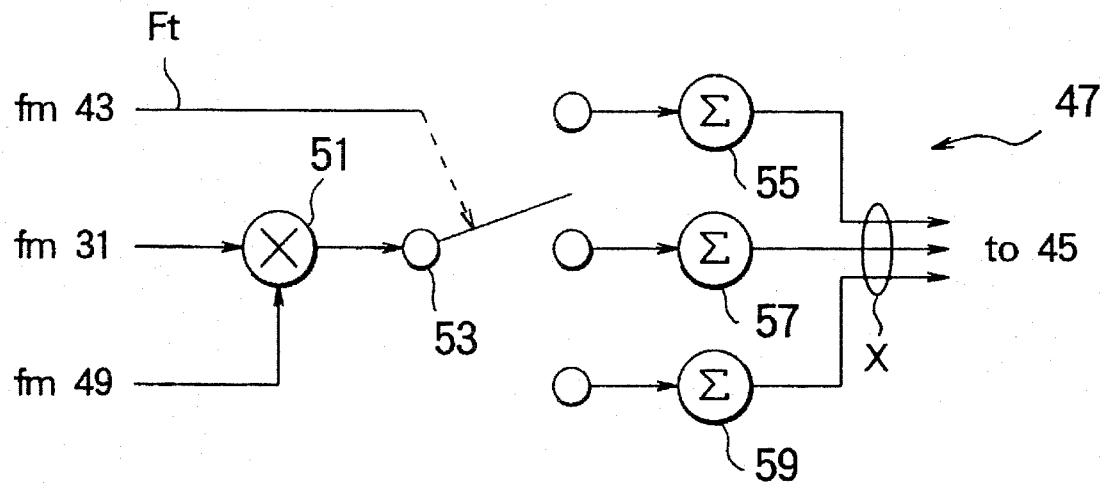
FIG. 2 is a block diagram of a conventional code amount characteristic value calculating unit used in the motion picture encoding device illustrated in FIG. 1.

Turning to FIG. 2 with FIG. 1 continuously referred to, the conventional code amount characteristic value calculating unit 47 comprises a calculator multiplier 51 supplied from the variable length encoder 31 with the produced code amount signal and from the quantization parameter deciding unit 49 with the quantization parameter signal. The calculator multiplier 51 calculates a code amount characteristic value per block by a product of the amount of actually produced codes per block and the quantization parkmeter Q to produce a calculator multiplier output signal representative of the code amount characteristic value per block.

A switch 53 is depicted as a mechanical switch merely for convenience of illustration. Controlled by the frame type signal Ft supplied from the frame type generator 43, the switch 53 switches the calculator multiplier product signal to produce a switched signal representative of the code amount characteristic value per block.

First through third summation circuits 55, 57, and 59 are supplied from the switch 53 selectively with the switched signal. Summing up the code amount characteristic value in each frame, each of the summation circuits 55 to 59 produces the code amount characteristic value signal X representative of the code amount characteristic value per frame for supply to the code amount assigning unit 45 in accordance with the selected schemes.

In FIGS. 1 and 2, it is now understood that the illustrated motion picture encoding device is operable when the selected scheme is adaptively selected from three encoding schemes. If more than three encoding schemes are used, the first through the third summation circuits 55 to 59 should be increased in number. The switch 53 should accordingly be modified.

In FIG. 1, the code amount assigning unit 45 assigns the code amounts assigned per frame in accordance with such encoding schemes. It will readily be possible to implement the code amount assigning unit 45.

Figure 3:
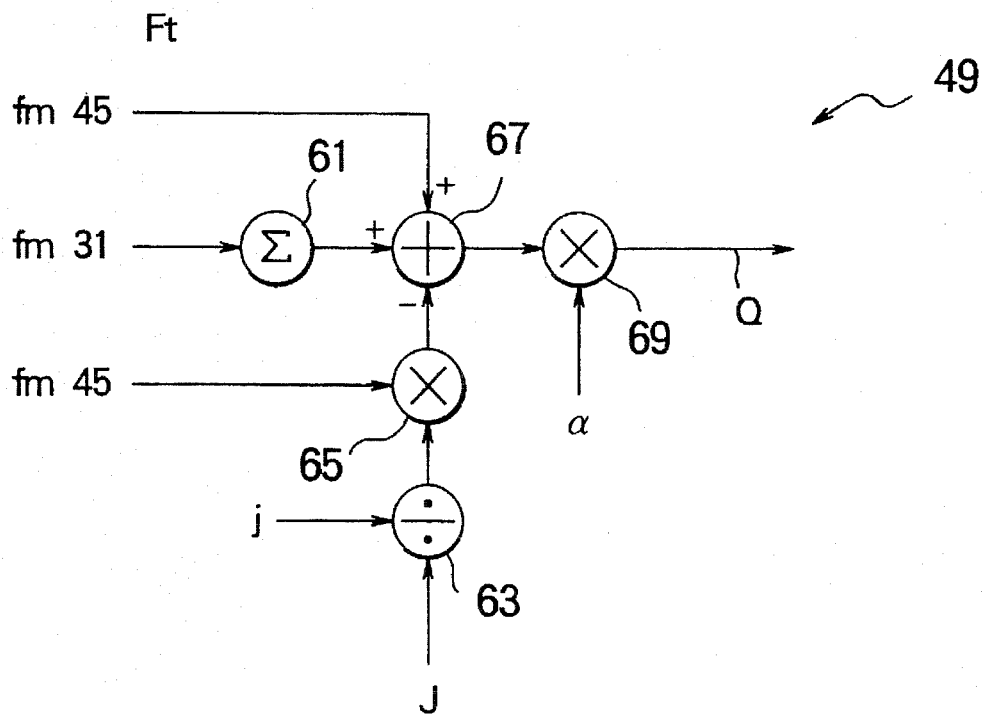
FIG. 3 is a block diagram of a conventional quantization parameter deciding unit used in the motion picture encoding device depicted in FIG. 1.

Further turning to FIG. 3 with reference to FIG. 1 continued, the conventional quantization parameter deciding unit 49 comprises a single summation circuit 61 supplied from the variable length encoder 31 with the produced code amount signal per block. Accumulating the amount of actually produced codes during each frame, the single summation circuit 61 produces a summation signal representative of a total amount of the variable length codes which are actually produced per frame.

It may be mentioned here that a block number j is given serially to the blocks in each frame up to a total number J. A divider 63 divides the block number by the total number to derive a normalized number j/J and to produce a divider output signal representative of the normalized number.

An input multiplier 65 is supplied from the code amount assigning unit 45 with the code amount signal and from the divider 63 with the divider output signal. The input multiplier 65 calculates an input product of the assigned code amount per frame and the normalized number j/J to produce an input product signal representative of the input product as a j-th partial code amount which should be assigned to a j-th block when the j-th block is processed by the local encoding and decoding circuits 35 and 37 and by the code amount characteristic value calculating unit 47.

An arithmetic circuit 67 is supplied from the transmission buffer 39 with the frame head occupancy amount signal through the code assigning unit 45, from the single summation circuit 61 with the summation signal, and from the input multiplier 65 with the input product signal. Adding the total amount of the variable length codes actually produced per frame to the frame head occupancy amount, the arithmetic circuit 67 calculates an intermediary occupancy amount of the variable length codes which would be stored in the buffer 39 from block to block if the buffer 39 would not produce the buffer output codes. Subtracting the j-th code amount from the intermediary occupancy amount, the arithmetic circuit 67 produces an arithmetic result signal representative, as an arithmetic result, a predicted occupancy amount B of the reserved codes which would remain in the buffer 39 if the buffer 39 would be supplied with the variable length codes of the assigned code amount per frame from block to block while producing the buffer output codes of j-th code amounts from block to block.

An output multiplier 69 is supplied from the arithmetic circuit 67 with the arithmetic result signal and furthermore with the control parameter α described hereinabove. The output multiplier 69 calculates the quantization parameter Q by a product of the control parameter and the predicted occupancy amount to produce the quantization parameter signal Q for delivery to the local encoding and decoding circuits 35 and 37 and to the code amount characteristic value calculating unit 47.

Figure 4:
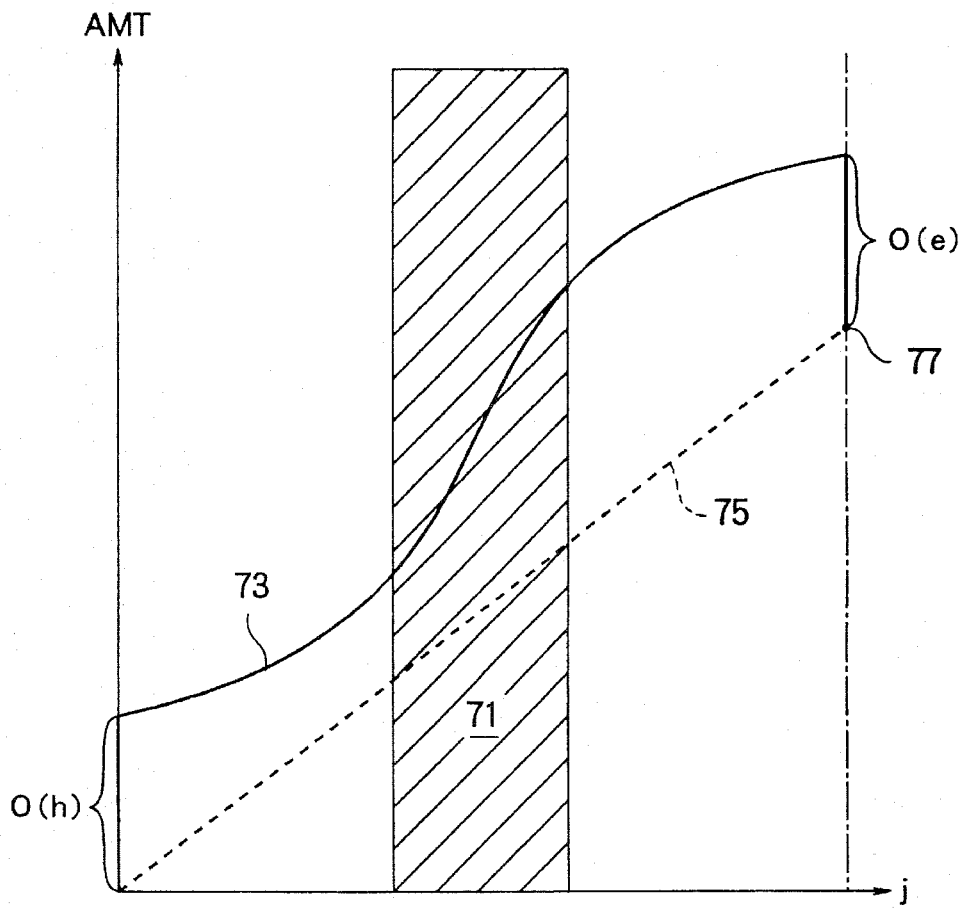
FIG. 4 shows characteristics of the motion picture encoding device illustrated in FIG. 1.
Figure 5:
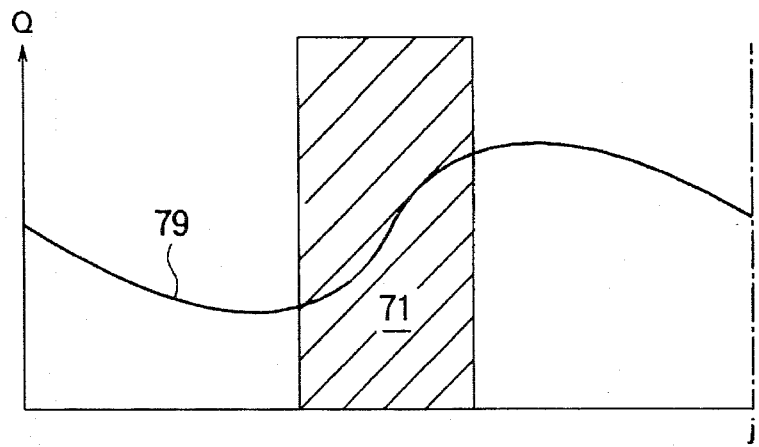
FIG. 5 shows different characteristics, of the motion picture encoding device depicted in FIG. 1.

Referring to FIGS. 4 and 5 with FIG. 1 continually referred to, time is scaled along the abscissa of each of FIGS. 4 and 5 by using the block number j in a frame. In the frame being taken into consideration, it will be assumed that the variable length encoder 31 actually produces a considerable number of the variable length codes in blocks indicated in a hatched area 71 as particular blocks.

In FIG. 4, the ordinate shows various amounts AMT of the variable length codes. A solid-line curve 73 shows an accumulation of the variable length codes actually supplied from the variable length encoder 31 to the transmission buffer 39. It is presumed that the buffer 39 holds a head amount of the reserved codes O(h) at the head of the frame being illustrated.

While supplied with the actually produced codes, the buffer 39 produces the buffer output codes representative of the output picture in each frame at the predetermined code rate exemplified by a slant dashed line 75. A point of intersection 77 of the dashed line 75 with a vertical dash-dot line representative of an end or trailing edge of the frame under consideration represents the code amount assigned by the code amount assigning unit 45 to the frame in question in accordance with the selected scheme which is applied to this frame. The buffer 39 holds the reserved codes of the buffer occupancy amount indicated by an area between the solid-line curve 73 and the slant dashed line 75. At the end of the frame under consideration, the buffer 39 holds an end amount of the reserved codes O(e) which is the head amount in a next subsequent frame.

In FIG. 5, the ordinate shows the quantization parameter Q. It should be noted that the quantization parameter Q is equal to the product of the control parameter α and the predicted occupancy amount and is decided by the quantization parameter deciding unit 49 in connection with the selected scheme used in the code amount assigning unit 45 and applied to the frame being taken into account. As a result, the quantization parameter becomes great when the buffer occupancy amount B grows great. In other words, the quantization parameter varies in the manner exemplified by a solid-line curve 79. The quantization step accordingly grows great. The amount of actually produced codes consequently decreases to cope with growth of the quantization parameter. The output picture nevertheless is given a deteriorated quality in the manner pointed out heretobefore.

Reviewing FIGS. 1 through 5 and more specifically to FIGS. 4 and 5, attention has now been directed by the present inventor to the fact that the amount of actually produced codes depends on the blocks of the successive frames. Such blocks, which are herein called unclassified blocks, are classified into classified blocks according to the present invention. The classified block of the j-th block number in each frame will be denoted by P(j).

Stated otherwise, amounts G(j)'s of the codes are actually produced in the classified blocks and depend on the classified blocks. A summation of the amounts of actually produced codes during each frame gives a total amount G of codes which are actually produced per frame and should be equal to a total assigned code amount T assigned to each frame.

The code amount characteristic value X is equal to a product of the quantization parameter Q and the amount G of actually produced codes and, has conventionally been calculated per frame. In connection with the j-th classified block p(j), a code amount characteristic value per block will be designated by X(p(j),j) or simply by X(j). The variable length encoder 31 produces the amount G(j) of actually produced codes for the j-th classified block p(j) The amount G(j) is consequently equal to the code amount characteristic value X(j) divided by the quantization parameter Q. In other words the quantization parameter should be decided for each of the classified blocks in accordance with the code amount characteristic values X(j)'s of the classified blocks of the successive frames.

In FIG. 5, the quantization parameter varies considerably from block to block. In contrast, the quantization parameter would be stabilized if decided in dependency on the code amounts assigned to the classified blocks for which blocks the code amount characteristic values may or may not vary. The total assigned code amount per frame is therefore distributed according to this invention into assigned code amounts T(j)'s for the j-th blocks p(j)'s of each frame in proportion to the code amount characteristic values of the respective classified blocks in the frame under consideration. The quantization parameter is decided for the classified blocks in compliance with the assigned code amounts per block. This suppressed the fluctuation throughout the successive frames and gives a most uniform possible quality to the output pictures.

It is now understood that the total code amount T assigned to each frame should be related to the total amount G of codes actually produced in the frame as follows:

$$T = \sum_j G(j)$$

$$= \frac{\sum_j X(p(j),j)}{Q}.$$

Therefore, the assigned code amount per block is given by:

$$T(j) = X(p(j),j)/Q$$
$$= TX(p(j),j)/\sum_j X(p(j),j).$$

Summarizing, the adaptive predicting encoding is controlled in accordance with this invention by calculating the total assigned code amount T by using the assigned code amount T(j) per block and by measuring, for use in place of the buffer occupancy amount, a difference between the total amount of actually produced code and the total assigned code amount in connection with each frame. It is impossible to know the code amount characteristic values preliminarily before actually processing each frame of the motion picture signal. It is, however, rendered possible according to this invention to predict the code amount characteristic values.

It should be noted in connection with the foregoing that the code amount characteristic value tends to be substantially constant from block to block if a particular encoding scheme is selected as the selected scheme from the various encoding schemes for similarly varying motion pictures. The code amount characteristic value, however, considerably varies depending on the encoding schemes. Generally speaking, the code amount characteristic value is appreciably small for the interframe prediction encoding scheme when compared with that for the intraframe encoding scheme.

It is consequently preferred to classify the unclassified blocks into the classified blocks in accordance with the selected scheme. In this case, the code amount characteristic values are calculated per block after completion of motion compensation prediction in connection with the frame under consideration.

Alternatively, it is possible to classify the unclassified blocks into the classified blocks in accordance with whether or not the selected scheme is subjected to a restriction when actually applied to the blocks. In other words, the unclassified blocks are subjected to classification in accordance with whether or not the blocks should be subjected to the refreshing technique. Inasmuch as the interframe prediction encoding scheme and the intraframe encoding scheme correspond to the blocks which need not and should be refreshed, similar technical merits are achieved by this classification in general unless a scene change takes place between two consecutive blocks. It is possible in this latter case to decide before detection of the motion vectors whether or not the blocks should be refreshed. This makes it possible to carry out the adaptive prediction encoding and encoding of the picture difference side by side.

Figure 6:
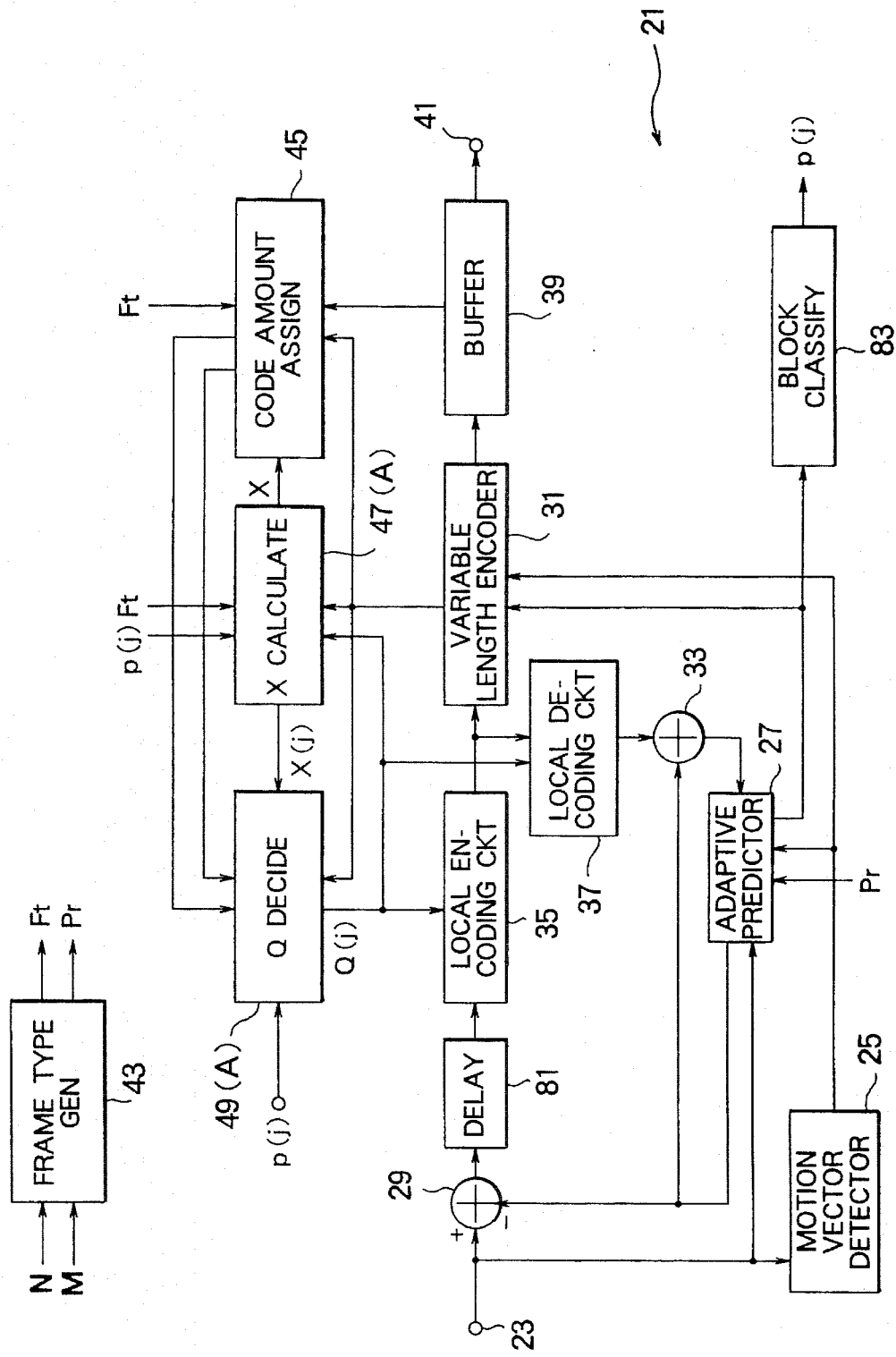
FIG. 6 is a block diagram of a motion picture encoding device according to a first embodiment of the instant invention.

Referring now to FIG. 6, the description will proceed to a motion picture encoding device according to a first embodiment of this invention. Similar parts are designated by like reference numerals and are similarly operable with likewise named signals. It will be understood at a first glance that this motion picture encoding device is very similar to the motion picture encoding device illustrated with reference to FIGS. 1 through 5.

In the adaptive prediction encoding unit 21 depicted in FIG. 6, a delay circuit 81 is interposed between the subtracter 29 and the local encoding circuit 35 and is supplied from the subtracter 29 with the difference signal to supply the local encoding circuit 35 with a delayed signal. The delay circuit 81 delays production of the delayed signal until the adaptive predictor 27 produces the predicted picture signal and the adaptive prediction type signal in connection with all blocks of each frame which may be whichever of the unclassified and the classified blocks.

The adaptive predictor 27 predicts the selected scheme in connection with each of the unclassified blocks of the successive frames. A block classifying circuit 83 is additionally used in the adaptive prediction encoding unit 21. Supplied with the adaptive prediction type signal from the adaptive predictor 27, the block classifying circuit 83 classifies the unclassified blocks of each frame into the classified blocks p(j)'s in accordance with the selected schemes to produce a block classification signal p(j) representative of classifications of the encoding schemes which should be applied to the blocks. This classification is to cope with the above-described fact that the amounts G(j)'s of actually produced codes depend on the selected schemes.

For example, it will be assumed that the refresh slice technique should be applied to selected blocks of a frame and need not be applied to others of the blocks. These others will be called unselected blocks. The selected blocks are encoded in accordance with the intraframe encoding scheme. The unselected blocks are encoded in accordance with the predictive encoding scheme. Under the circumstances, the block classification signal p(j) may represent I in connection with the selected blocks and P for the unselected blocks.

A novel code amount characteristic value calculating unit 47(A) and a novel quantization parameter deciding unit 49(A) are substituted for the conventional code amount characteristic value calculating and quantization parameter deciding units 47 and 49 used in the conventional motion picture encoding device. The code amount assigning unit 45 is operable as before except that the assigned code amount T is not determined in connection with each frame but that such assigned code amounts T(j) are determined in connection with the classified blocks.

The code amount characteristic value calculating unit 47(A) delivers the code amount characteristic value signal X as a frame code amount characteristic value signal to the code amount assigning unit 45 like the conventional code amount assigning unit 47 illustrated with reference to FIG. 2. Supplied additionally with the block classification signal p(j) from the block classification circuit 83, the code amount characteristic value calculating unit 47(A) furthermore calculates the code amount characteristics values X(j)'s for the classified blocks and produces a block code amount characteristic value signal X(j).

The quantization parameter deciding unit 49(A) is additionally supplied from the block classifying circuit 83 with the block classification signal p(j) and from the code amount characteristic value calculating unit 47(A) with the block code amount characteristic signal X(j). The quantization parameter Q, which is produced by the conventional quantization parameter deciding unit 49 illustrated with reference to FIG. 3, will now be called a frame quantization parameter. In contrast, the quantization parameter deciding unit 49(A) decides a block quantization parameter Q(j) per block and produces a block quantization parameter signal Q(j) representative of such block quantization parameters in the classified blocks. The block quantization parameter signal is delivered to the local encoding and decoding circuits 35 and 37. In place of the frame quantization parameter, the block quantization parameters are used in the code amount characteristic value calculating unit 47(A).

Figure 7:
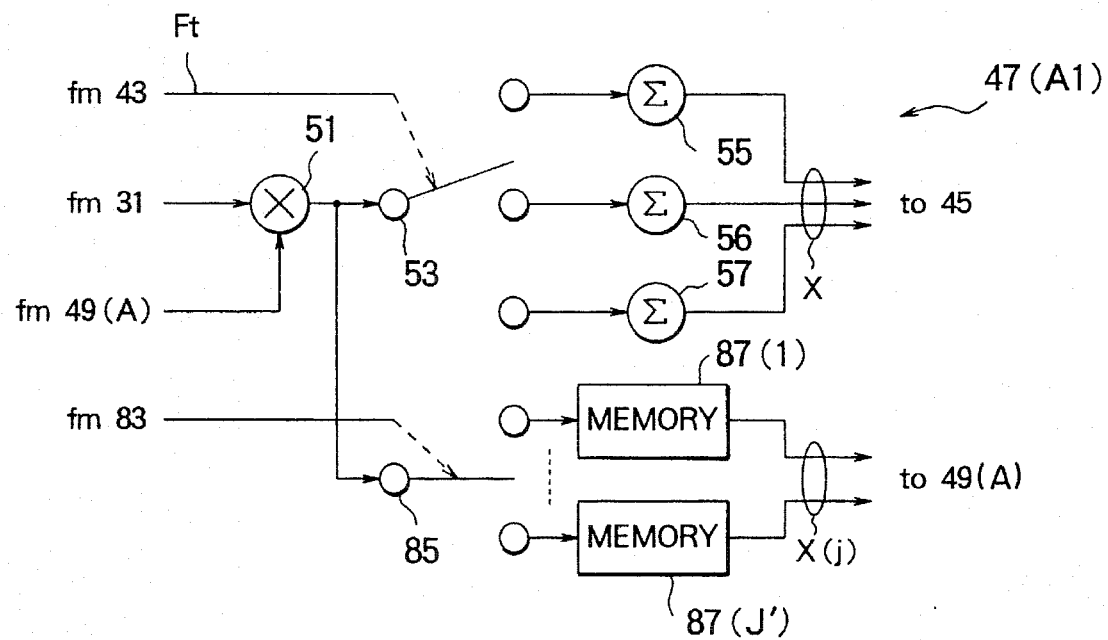
FIG. 7 is a block diagram of a code amount characteristic calculating unit for use in the motion picture encoding device depicted in FIG. 6.

Turning to FIG. 7 with FIG. 6 continuously referred to, an example of the code amount characteristic value calculating unit 47(A) is illustrated as a first code amount characteristic value calculating unit 47(A1). Similar parts are designated by like reference numerals.

Like in the code amount characteristic value calculating unit 47 illustrated with reference to FIG. 2, the multiplier 51 is supplied from the variable length encoder 31 with the produced code amount signal per block and from the quantization parameter deciding unit 49(A) with the block quantization parameter signal Q(j) to calculate the block code amount characteristic value X(j) per block and to produce the block code amount characteristic value signal. The switch 53 is now called a first calculator switch. This switch 53 and the first through the third summation circuits 55 to 59 are operable in the manner described in conjunction with FIG. 2.

In FIG. 7, a second calculator switch 85 is supplied from the multiplier 51 with the block code amount characteristic value signal and is controlled by the block classification signal p(j) which is supplied from the block classifying circuit 83 to represent the classifications, such as I and/or P. Produced from the second calculator switch 85, a switched signal is selectively supplied to first through J-th memories, of which only the first and the J-th memories are depicted at 87(1) and 87(J') merely for simplicity of illustration and from each of which the block code amount characteristic value X(j) is delivered to the quantization parameter deciding unit 49(A), where J' will later be exemplified.

Figure 8:
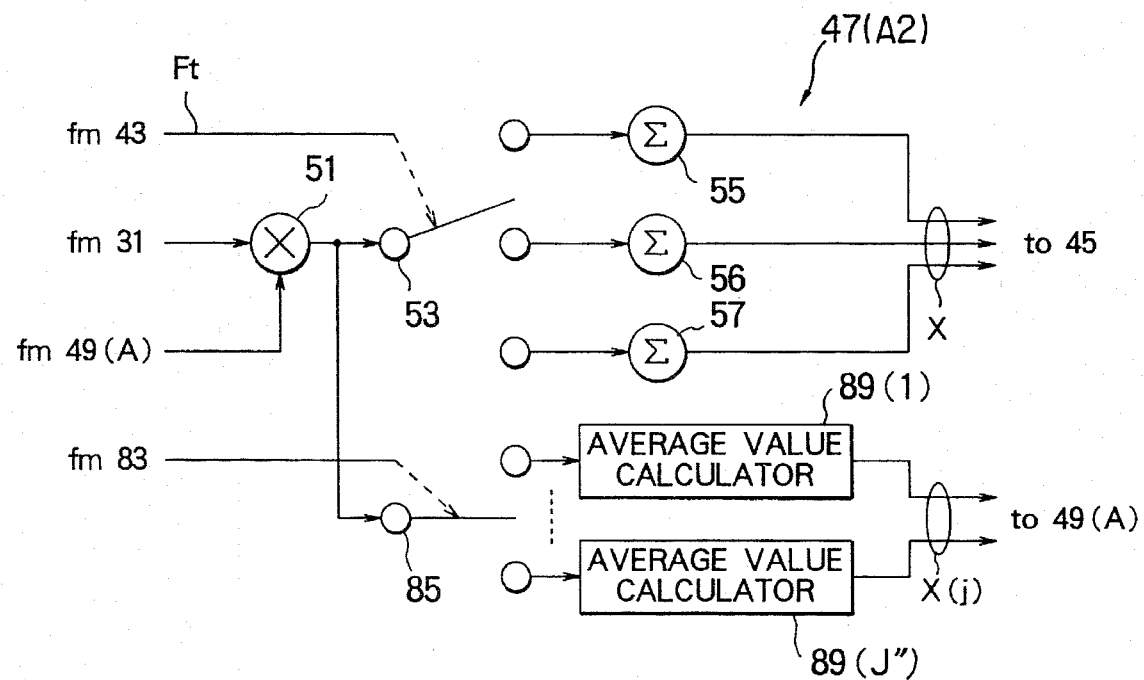
FIG. 8 is a block diagram of a different code amount characteristic calculating unit for use in the motion picture encoding device illustrated in FIG. 6.

Further turning to FIG. 8 with reference to FIG. 6 continued, another example of the code amount characteristic value calculating unit 47(A) is depicted as a second code amount characteristic value calculating unit 47(A2). Similar parts are again designated by like reference numerals.

In the second code amount characteristic value calculating unit 47(A2), first through J"-th average value calculators are substituted for the first through the J-th memories 87(1) to 87(J') described in connection with FIG. 7, where J" will later be exemplified. Among the average value calculators, only the first and the J"-th average value calculators are shown at 89(1) and 89(J"). The j-th average value calculator 89(j) calculates an average value of the j-th code amount characteristic value X(j) during the successive frames up to the current frame to make it possible to calculate the frame code amount characteristic value from the average value of the j-th code amount characteristic value. The block code amount characteristic value signal X(j) represents the average value and is delivered to the quantization parameter deciding unit 49(A).

Figure 9:
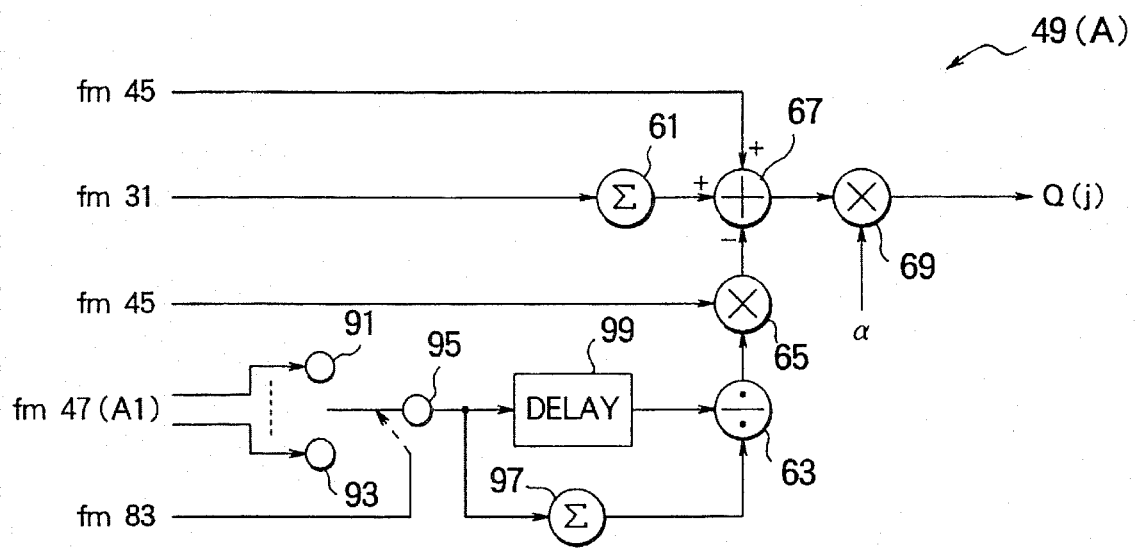
FIG. 9 is a block diagram of a quantization parameter dividing unit for use in the motion picture encoding device shown in FIG. 6.

Still further turning to FIG. 9 with FIG. 6 continually referred to, the quantization parameter deciding unit 49(A) will be described in detail. Similar parts are designated by like reference numerals. It will be first surmised that the quantization parameter deciding unit 49(A) is connected to the first code amount characteristic value calculating unit 47(A1) illustrated with reference to FIG. 7.

The quantization parameter deciding unit 49(A) is supplied from the block classifying circuit 83 with the block classification signal p(j). From the first through the J-th memories 87 (suffixed omitted) described in conjunction with FIG. 7, first through J-th unit input terminals are supplied with the block code amount characteristic values X(j)'s calculated when the block classification signal indicates the first through the J-th classified blocks of a frame which blocks may be classified in accordance with different selected schemes. Among the unit input terminals, only the first and the J-th unit input terminals are depicted at 91 and 93.

A decider switch 95 is controlled by the block classification signal to select, as a j-th selected value, the block code amount characteristic value calculated for the j-th classified block if the block classification signal indicates the j-th classified blocks. Supplied with the j-th selected value from the switch 95, a unit accumulator 97 accumulates into an accumulated value the selected values produced throughout the first through the J-th classified blocks of each frame. Supplied likewise with the j-th selected value, a decider delay circuit 99 produces a j-th delayed value concurrently with production of the accumulated value from the unit accumulator 97. The divider 63 divides the j-th delayed value by the accumulated value to produce the divider output signal which is equivalent to the divider output signal described in connection with FIG. 3. It is now understood that quantization parameter deciding unit 49(A) produces the block quantization parameter signal Q(j).

It will now be surmised that the quantization parameter deciding unit 49(A) is connected to the second code amount characteristic value calculating unit 47(A2) illustrated with reference to FIG. 8. It will readily be understood that the quantization parameter deciding unit 49(A) is similarly operable to produce the block quantization parameter signal Q(j).

Reviewing FIGS. 6 through 9, the unclassified blocks are satisfactorily classified into the classified blocks by the block classifying circuit 83 which is supplied from the adaptive predictor 27 with the adaptive prediction type signal indicative of the selected schemes for the classified blocks. Taken into consideration is the fluctuations in the amount of actually produced codes along the successive blocks by cooperation of the block classifying circuit 83 and the quantization parameter deciding unit 49(A). Inasmuch as it is impossible to put the quantization parameter deciding unit 49(A) into operation until the adaptive predictor 27 completes its operation of dealing with the blocks in a frame, use is made of the delay circuit 81.

Figure 10:
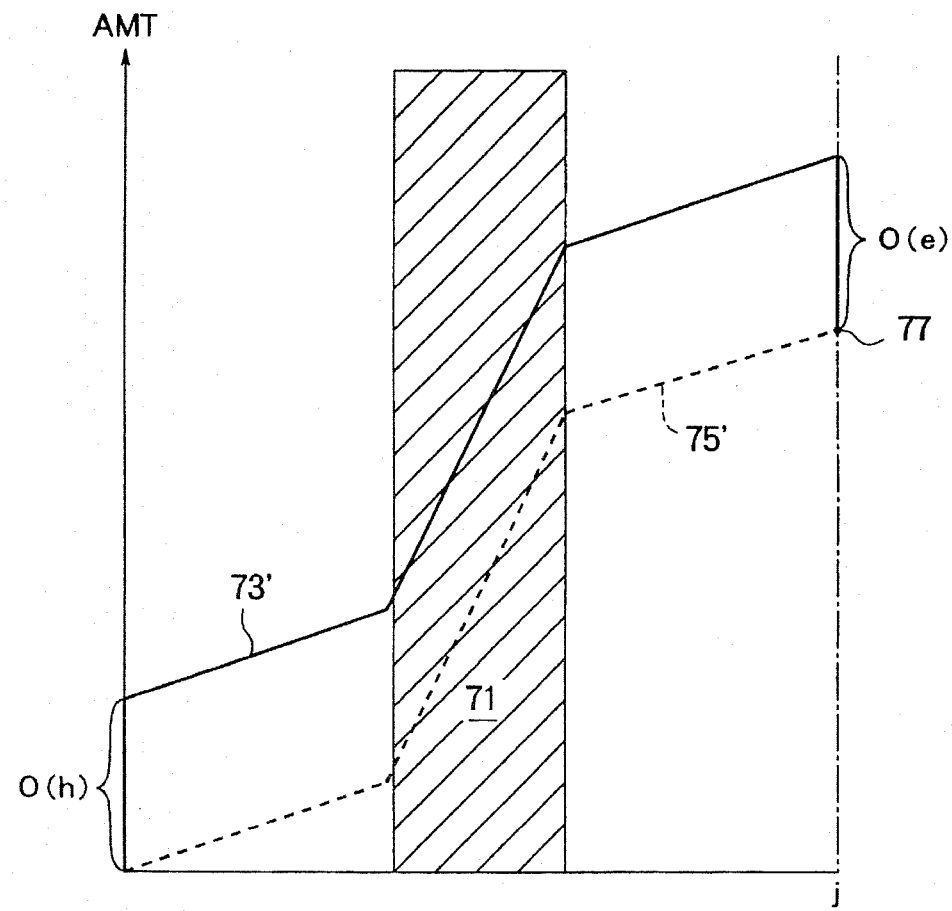
FIG. 10 exemplifies characteristics of the motion picture encoding device illustrated in FIG. 6.
Figure 11:
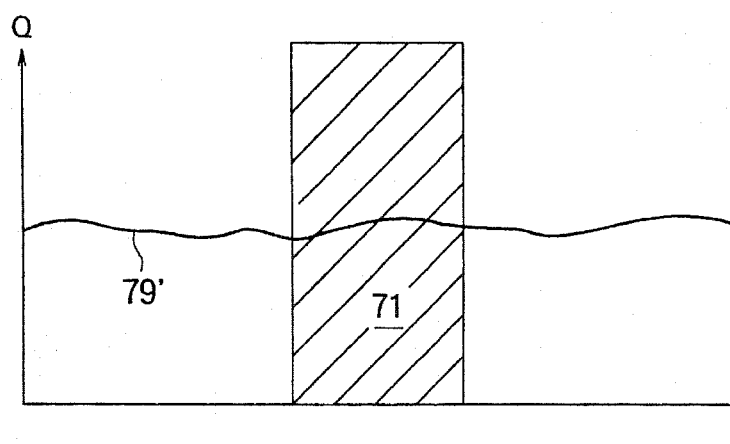
FIG. 11 shows different characteristics of the motion picture encoding device depicted in FIG. 6.

FIGS. 10 and 11 correspond to FIGS. 4 and 5. In FIG. 10, the amount of actually produced codes is illustrated by a solid-line polygonal line 73' in connection with the successive classified blocks in a frame. The assigned code amount is likewise depicted by a dashed-line polygonal line 75'. The assigned code amount is greater in the blocks of the hatched area 71. The lines 73' and 75' are vertically spaced apart by the buffer occupancy amount. It is consequently clear that the transmission buffer 39 (FIG. 6) is desiredly operable even when the buffer capacity is smaller and gives the motion picture signal only with a small delay to produce the output picture.

In FIG. 11, the block quantization parameter Q(j) is depicted by a nearly horizontally straight curve 79'. It is clear that the output picture has a substantially uniform quality throughout the successive frames.

Operation of the conventional motion picture encoding device will be compared with thee motion picture encoding device illustrated with reference to FIGS. 6 through 11. It will be assumed that each frame is divided into #0 through #11 blocks, four blocks along each horizontal line and three blocks along each vertical line, with the block numbers 0 through 11 increased consecutively along each horizontal line and successively along the vertical line. In both, the total assigned code amount T is assigned to the current frame at the leading edge of the frame.

In FIGS. 1 through 5, the assigned code amount T(j) is equal to T/J presuming that each block actually produces a common amount of codes. The quantization parameter Q(j) is decided in connection with each block as follows:

$$Q(j) = \alpha B(j),$$
$$B(j) = O(h) + \sum_{k=0, j-1} G(k) - \sum_{k=0, j-1} T(k)$$
$$= O(h) + \sum_{k=0, j-1} G(k) - jT/J.$$

When T=1000, α=0.1, and O(h)=200, the input j and G(j) and the output B(j) and Q(j) correspond as follows:

| j | 0 | 1 | 2 | 3 | 4 | 5 | 6 | 7 | 8 | 9 | 10 | 11 |
|---|---|---|---|---|---|---|---|---|---|---|----|----|
| G(j) | 50 | 30 | 70 | 50 | 120 | 150 | 180 | 150 | 50 | 60 | 60 | 30 |
| B(j) | 200 | 167 | 113 | 100 | 67 | 103 | 170 | 267 | 333 | 300 | 277 | 253 |
| Q(j) | 20 | 17 | 11 | 10 | 7 | 10 | 17 | 27 | 33 | 30 | 28 | 25 |

In FIGS. 6 through 11, the classifications for the blocks of each frame become clear at the trailing edge of the block under consideration. The assigned code amount T(j) is assigned by using the block number j and the classification p(j). For example, the block code amount characteristic value X(p(j), j) is X(P, 1) if the first block should be subjected to the predictive encoding scheme P. Usually, X(I, j) is three to five times as great as X(P, j). The quantization parameter Q(j) is decided with:

| j | 0 | 1 | 2 | 3 | 4 | 5 | 6 | 7 | 8 | 9 | 10 | 11 |
|---|---|---|---|---|---|---|---|---|---|---|----|----|
| G(j) | 50 | 30 | 70 | 50 | 120 | 150 | 180 | 150 | 50 | 60 | 60 | 30 |
| B(j) | 200 | 205 | 189 | 168 | 173 | 156 | 170 | 168 | 182 | 186 | 201 | 215 |
| Q(j) | 20 | 20 | 19 | 17 | 17 | 16 | 17 | 17 | 18 | 19 | 20 | 22 | substituted for jT/J in the above-given equation for B(j).

It will now be assumed that X(p(j), j) has the values of 50 in connection with the #0, ∩1, #3, and the #8 through the #11 blocks subjected to the prediction encoding scheme P and that X(p(j), j) has the values of 100 for the #2 block, of 150 for the #4, #5, and #7 blocks, and of 200 for the #6 block, which blocks are subjected to the intraframe encoding scheme I. The total assigned code amount T and others will be assumed as above. Under the circumstances, the input and the output correspond as follows:

| j | 0 | 1 | 2 | 3 | 4 | 5 | 6 | 7 | 8 | 9 | 10 | 11 |
|---|---|---|---|---|---|---|---|---|---|---|----|----|
| G(j) | 50 | 30 | 70 | 50 | 120 | 150 | 180 | 150 | 50 | 60 | 60 | 30 |
| B(j) | 200 | 205 | 189 | 168 | 173 | 156 | 170 | 168 | 182 | 186 | 201 | 215 |
| Q(j) | 20 | 20 | 19 | 17 | 17 | 16 | 17 | 17 | 18 | 19 | 20 | 22 |

It is possible to calculate the bode amount characteristic value X(p(j), j) in compliance with a desired one of three manners which will be summarized in the following in Items (1) through (3). The manner of Item (3) will later be described in greater detail.

(1) The code amount characteristic value X(p(j), j) is calculated in connection with each block and each classification. In this event, the characteristic values are stored in the memories 87 when the frame was encoded into the variable length codes. The characteristic value is given by a product of G(j) and Q(j). In the above-mentioned example where the #3 block is subjected to the predictive encoding scheme, X(P, 3) is given by the product of G(3) and Q(3). Inasmuch as the number of blocks in each frame is twelve and the number of classifications is two, the memories 87 should be 12×2=24 in number. In FIG. 7, J' represents twenty-four, each memory being a word memory.

(2) The average value is used in place of the code amount characteristic value X(p(j), j) for each of the classifications p(j)'s. In this event, the average values are calculated during previous encoding of each frame into the variable length codes. In FIG. 8, the average value calculators 89 should be equal in number to the classifications. When the classifications are two in number, J" is equal to two.

(3) The motion compensation prediction is used in combination with the manner described in Item (1). The unclassified blocks are classified into the classified blocks in accordance with whether or not the unclassified blocks should be subjected to the slice refresh technique. Inasmuch as it is preliminarily known whether or not the block should be slice refreshed, the block classifying circuit 83 can classify the blocks concurrently with encoding into the variable length codes. The total assigned code amount T is determined as above as the leading edge of each frame.

It will now be presumed that the #4 through the #7 blocks should be slice refreshed with the intraframe encoding scheme applied and that the #2 block need not be slice refreshed and subjected to the predictive encoding scheme. The assigned code amount T(j) is calculated by using the block number j and the classification p(j). Equations therefor are not different from those described in connection with the above in Item (2).

X(p(j), j) will be assumed to have the values of 50 for the #0 through the #3 and the #8 through the #11 blocks of the classification P and of 200 for the #4 through the #7 blocks of the classification I. In this event, the input and the output correspond as follows if T, α, and O(h) are as above. The code amount characteristic values X(p(j), j) are calculated as above.

| j | 0 | 1 | 2 | 3 | 4 | 5 | 6 | 7 | 8 | 9 | 10 | 11 |
|---|---|---|---|---|---|---|---|---|---|---|----|----|
| G(j) | 50 | 30 | 70 | 50 | 120 | 150 | 180 | 150 | 50 | 60 | 60 | 30 |
| B(j) | 200 | 209 | 197 | 225 | 233 | 187 | 170 | 183 | 167 | 175 | 193 | 212 |
| Q(j) | 20 | 21 | 20 | 22 | 23 | 19 | 17 | 18 | 17 | 18 | 19 | 21 |

Referring now to FIG. 12, the description will proceed to a motion picture encoding device according to a second embodiment of this invention. Similar parts are designated again by like reference numerals.

In FIG. 12, the block classifying circuit 83 is not supplied from the adaptive predictor 27 with the adaptive prediction type signal but from the frame type generator 43 with a restriction information signal for restricting the selected schemes into restricted schemes. The block classifying circuit 83 thereby produces the block classification signal p(j) indicative of the classified blocks into which the unclassified blocks are classified in accordance with whether or not the selected schemes are restricted to the restricted schemes. The restricted schemes are for use in encoding the classified blocks to allow application of the transmission error recovery and the start of decoding at an indefinite time instant in the manner described heretobefore. It is consequently possible to make the block classifying circuit 83 produce the block classification signal before the adaptive predictor 27 completes processing of one of the successive frames that comprises the unclassified blocks under consideration. In addition, the block classifying circuit 83 produces a serial classification signal Sc indicative of the classified blocks serially in an order in which the classified blocks should be encoded in accordance with the restricted schemes.

In the motion picture encoding device being illustrated, use is not made of the delay circuit 81 described in conjunction with FIG. 6. A different novel quantization parameter deciding unit 49(B) is used in the manner which will be described in the following.

Figure 13:
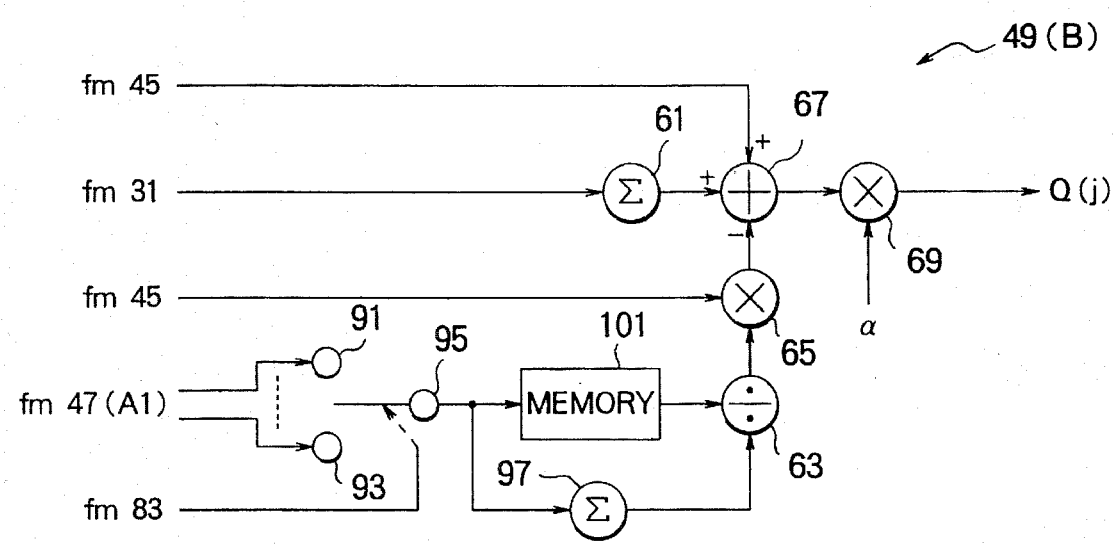
FIG. 13 is a block diagram of a quantization parameter deciding unit for use in the motion picture encoding device illustrated in FIG. 12.

Turning to FIG. 13, the quantization parameter deciding unit 49(B) comprises similar parts designated by like reference numerals. Instead of the block classification signal used in the quantization parameter deciding unit 49(A) illustrated with reference to FIG. 9, the serial classification signal is supplied from the block classifying circuit 83 to control the decider switch 95. A decider memory 101 is substituted for the decider delay circuit 99 described in connection with FIG. 9. It is now understood that the quantizer parameter deciding unit 49(B) decides the block quantization parameter in the order specified by the serial classification signal.

Figure 14:
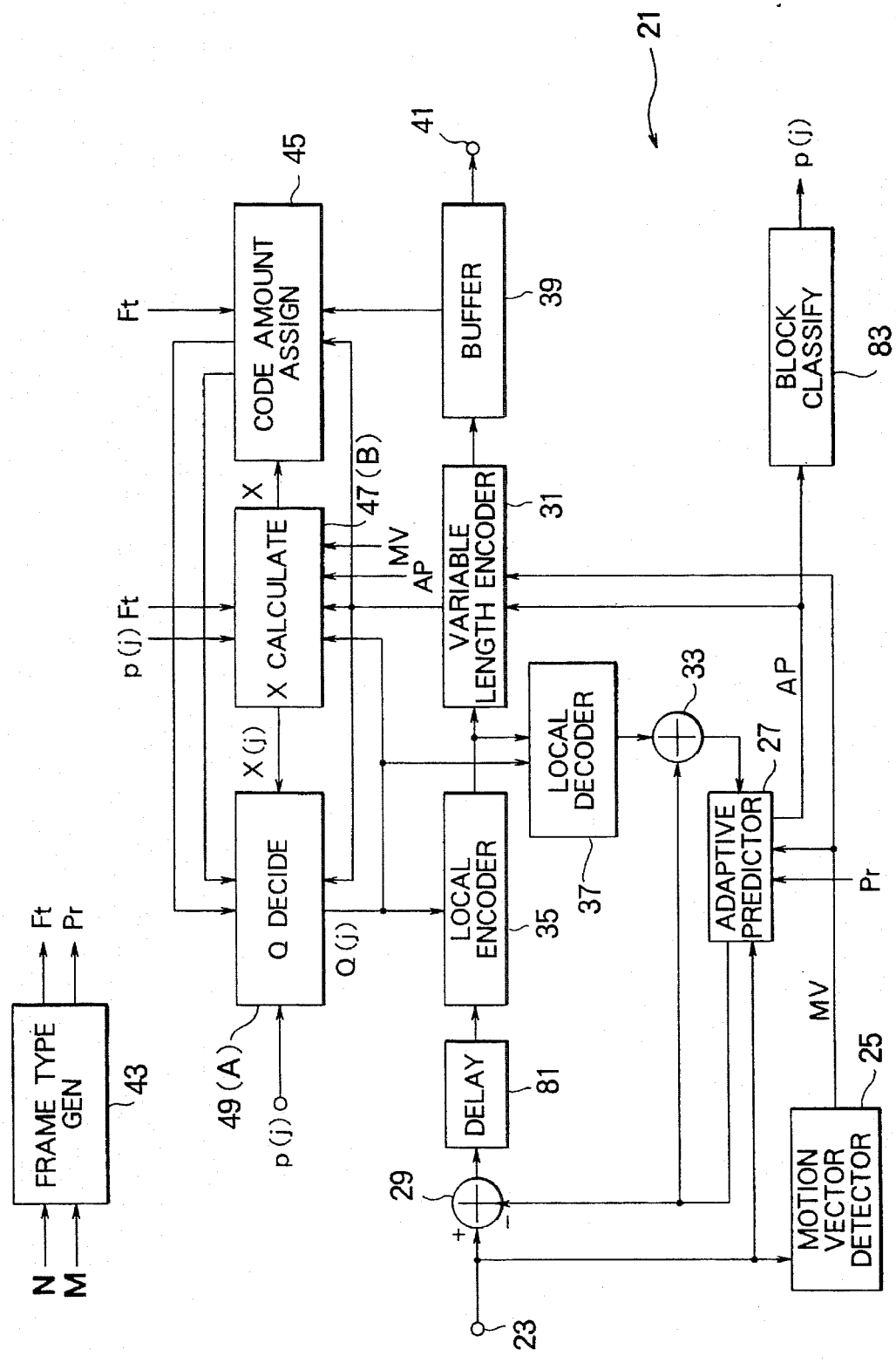
FIG. 14 is a block diagram of a motion picture encoding device according to a third embodiment of this invention.

Referring to FIG. 14, the description will proceed to a motion picture encoding device according to a third embodiment of this invention. Similar parts are designated once more by like reference numerals. The motion vector signal is indicated by a reference symbol MV. The adaptive prediction type signal is designated by another reference symbol AP.

The delay circuit 81 and the block classifying circuit 83 are used as in FIG. 6. A different code amount characteristic value calculating unit 47(B) is substituted for the novel code amount characteristic value calculating unit 47(A) described in conjunction with FIG. 6. Supplied additionally with the motion vector signal MV and the adaptive prediction type signal AP, the code amount characteristic value calculating unit 47(B) calculates as follows the code amount characteristic values with motion compensation prediction as motion compensation predicted amount characteristic values per block. The code amount characteristic value calculating unit 47(B) thereby produces, in addition to the code amount characteristic value signal X, a motion compensation predicted block code amount characteristic value signal which represents the motion compensation predicted amount values per block and is an equivalent of the block code amount characteristic value signal X(j).

Figure 15:
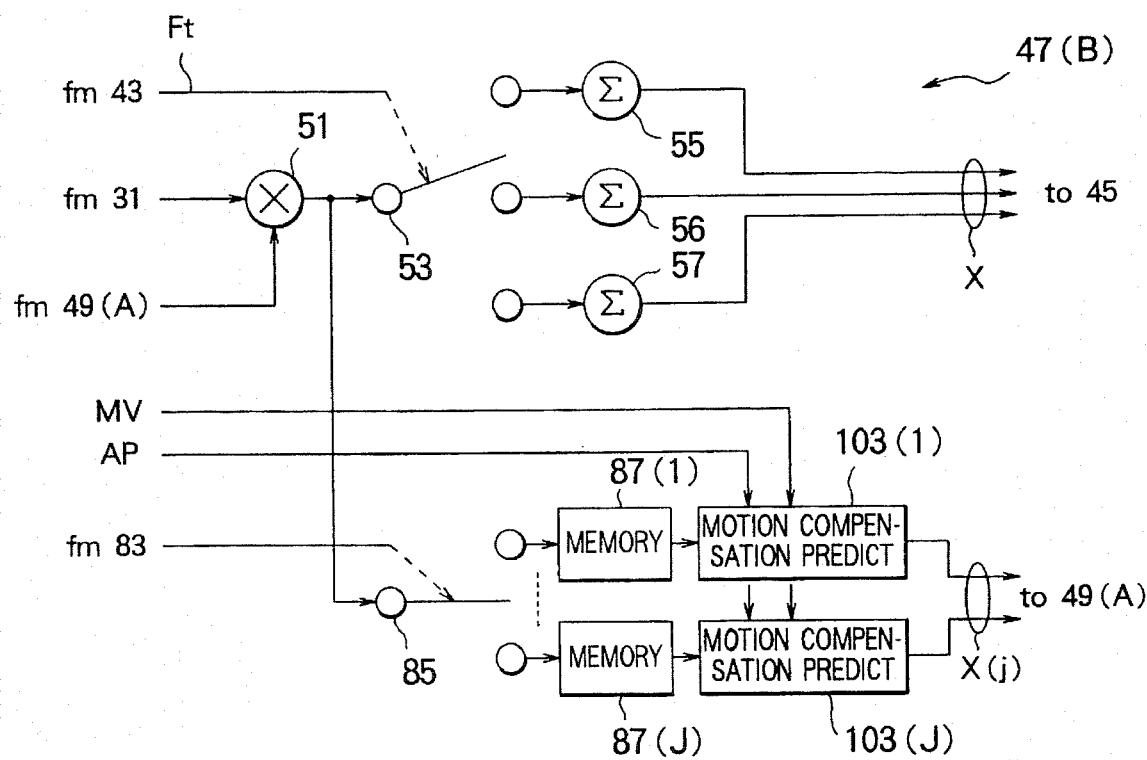
FIG. 15 is a block diagram of a quantization parameter deciding unit for use in the motion picture encoding device depicted in FIG. 14.

Turning to FIG. 15 with FIG. 14 continuously referred to, the code amount characteristic value calculating unit 47(B) comprises similar parts designated by like reference numerals. In the manner described in the foregoing, the motion vector signal MV and the adaptive prediction type signal AP are additionally used.

As before, the second calculator switch 85 is controlled by the block classification signal p(j) supplied from the block classifying circuit 83 and delivers the block code amount characteristic value signal from the multiplier 51 to the first through the J-th memories 87, among which only the first and the J-th memories 87(1) and 87(J) are illustrated. First through J-th motion compensation prediction circuits are connected to the first through the J-th memories 87. Only the first and the J-th motion compensation prediction circuits are depicted at 103(1) and 103(J). Each of the motion compensation prediction circuits 103 (suffixes omitted) is supplied with the motion vector signal and the adaptive prediction type signal and from a pertinent one of the memories 87 with the block code amount characteristic value signal.

In the manner known in the art, each of the motion compensation prediction circuits 103 subjects the block code amount characteristic value signal under consideration to motion compensation prediction in compliance with the motion vector represented by the motion vector signal and the most pertinent type of adaptive prediction indicated by the adaptive prediction type signal for one of the classified blocks that is pointed out by the block classification signal used in controlling the second calculator switch 85. It is now clear that the code amount characteristic value calculating unit 47(B) produces the motion compensation prediction block code amount characteristic value signal which is an equivalent of the block code amount characteristic value signal and is therefore denoted by the reference symbol X(j).

What is claimed is:

1. A motion picture encoding device for encoding a motion picture signal composed of successive frames, each of said successive frames composed of a predetermined number of unclassified blocks, and in which selected schemes are selected from a plurality of encoding schemes, said motion picture encoding device comprising:

classifying means for classifying the unclassified blocks of each of said successive frames into classified blocks based on a prediction type restriction information for restricting said selected schemes;

calculating means for calculating a code amount characteristic value by using a product of a multiplication factor and an amount of codes actually produced from each of said classified blocks as an actually produced code amount;

assigning means for producing assigned code amounts for each of said classified blocks based on respective code amount characteristic values calculated in connection with each of said classified blocks;

deciding means for deciding a quantization parameter for use as said multiplication factor based on said actually produced code amount and one of said assigned code amounts that is produced by using said actually produced code amount; and encoding means for encoding the classified blocks of said successive frames in accordance with said selected schemes and said quantization parameter.

2. A motion picture encoding device as claimed in claim 1, wherein said deciding means comprises:

calculating means for calculating a code amount characteristic value per classified block by a product of said quantization parameter and said amount of produced codes;

assigning means for assigning said assigned code amounts to said classified blocks based on said amount of produced codes, individual amounts of the reserved codes kept during said classified blocks, and said code amount characteristic value; and quantization parameter deciding means for deciding said quantization parameter based on said amount of produced codes, an initial amount, said code amount characteristic value, and one of said individual amounts that is kept in said each of the classified blocks.

3. A motion picture encoding device as claimed in claim 1, wherein said classifying means classifies said unclassified blocks into said classified blocks in accordance with said selected schemes.

\* \* \* \* \*